A. W. FAEH.
AUTOMATIC FIRE ESCAPE.
APPLICATION FILED DEC. 14, 1909.
978,571.
Patented Dec. 13, 1910.
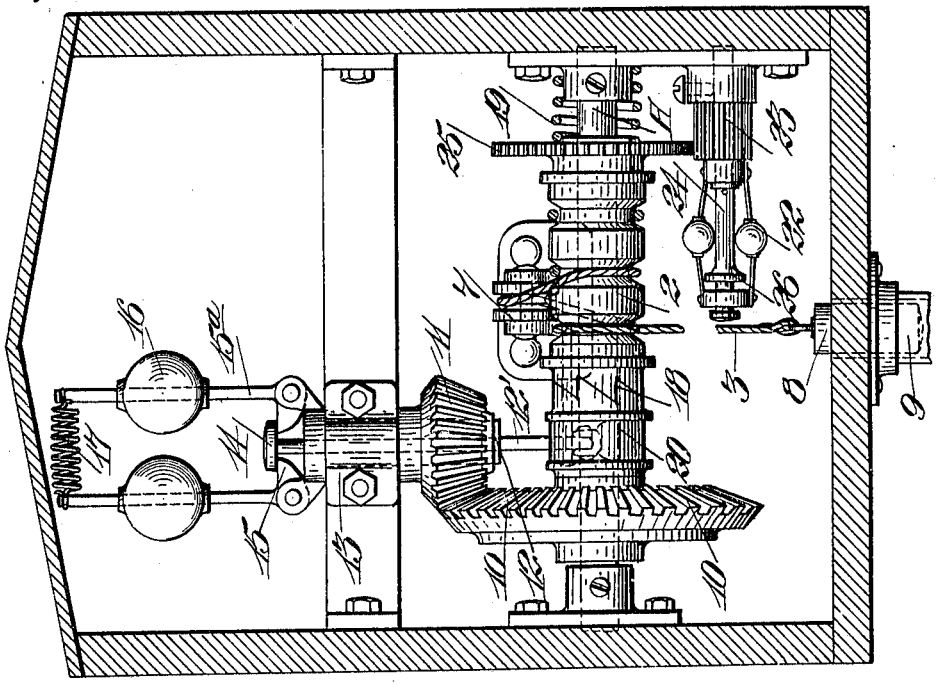
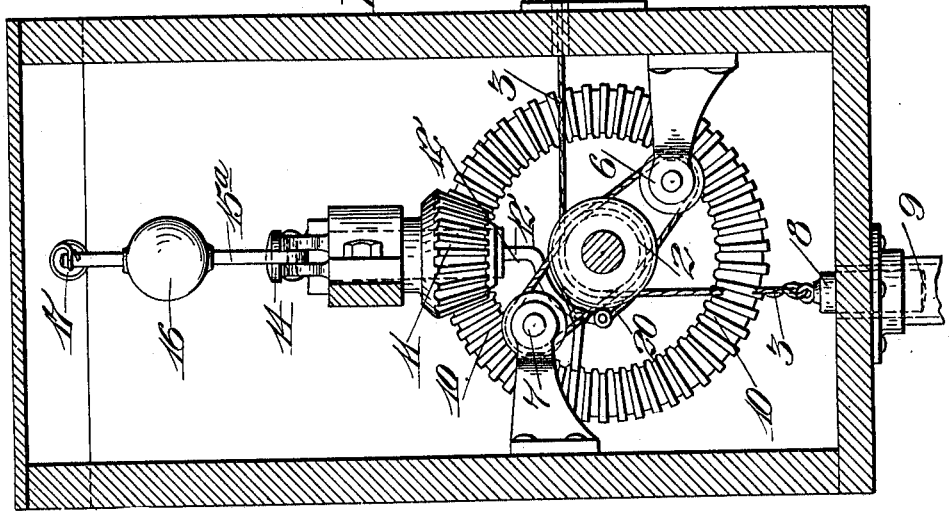

UNITED STATES PATENT OFFICE.

AMBROSE W. FAEH, OF OAKLAND, CALIFORNIA.

AUTOMATIC FIRE-ESCAPE.

978,571.  Specification of Letters Patent.  Patented Dec. 13, 1910.

Application filed December 14, 1909. Serial No. 532,975.

*To all whom it may concern:*

Be it known that I, AMBROSE W. FAEH, a citizen of the United States, residing at Oakland, in the county of Alameda and State of California, have invented new and useful Improvements in Automatic Fire-Escapes, of which the following is a specification.

My invention relates to improvements in apparatus designed to facilitate the escape of people from burning buildings, and also generally to lower weights from an elevation, and to regulate the speed of downward movements.

It also includes a means for automatically returning the apparatus after the weight has been removed, and to regulate the speed of return movement.

My invention consists in the combination of parts, and in details of construction which will be more fully explained by reference to the accompanying drawings, in which—

Figure 1 is a view transverse to the drum shaft. Fig. 2 is a side elevation at right angles with Fig. 1.

The object of my invention is to provide a means by which a weight may be lowered from an elevation, and the rate of movement of such weight regulated while descending, and a means by which the lowering apparatus may be returned after the weight has been removed, and the upward speed of movement correspondingly regulated.

As shown in the drawings, A is a shaft.

2 is a drum mounted upon the shaft, around which drum a rope 3 is wound as follows: The outer end of the rope carries the belt or lowering device 4, and the rope passes over a pulley 5 which gives the carrier 4 a clear vertical movement to the ground or point of deposit. From this point the rope passes around the drum 2, thence around another fixed drum or pulley 6, thence back around the drum again, and again around another pulley 7, thence passing around the drum 2 again it extends down to and has a weight 8 attached to it. This weight may be guided in a suitable tube or casing 9 to prevent obstruction.

Upon the shaft A is mounted a gear-wheel 10, and this engages with a pinion 11 mounted upon a vertical shaft 12. A rod 12′ extends upwardly through the shaft 12, and its upper end has a head or equivalent device 14 which engages the short arms 15 of the governor, this governor being composed of balls 16 mounted upon the longer arms 15ª of the bell-crank levers. The short arms 15 before described engage the head 14.

The upwardly extending arms 15ª are normally drawn together by a spring 17 of sufficient power to normally maintain the governor in the position shown in Fig. 2.

18 is a clutch of suitable description, the engaged members of which are maintained in contact by means of an end thrust spiral spring 19 which acts against the drum 2 and the movable member of the clutch which moves in unison with the drum, and thus causes the members of the clutch to remain in engagement. This spring will however yield sufficiently to allow the engaging members of the clutch to slip past each other, when the drum is turned in the opposite direction as will be hereafter described.

The lower end of the governor shaft 12 engages one end of the band brake 20, as shown in Fig. 1, and the opposite end of the band brake is fixed so that when the governor balls are forced apart by centrifugal force, the stem or shaft 12 will be raised by the action of the arms 15, and will thus tighten the band brake about its drum, and correspondingly retard the downward movement of the body or weight which is being lowered by the carrier 4.

Such a device has been practically shown to carry any weight from 30 to 300 lbs. without injuriously increasing the speed at which it is lowered.

In order to return the apparatus to its initial point, after the weight has been removed, the weight 8, acting through the rope 3, will descend through the guide tube 9, and will reverse the movement of the winding drum 2. The clutch members 18 will readily slip over each other to allow this movement to take place.

In order to regulate the descent of the weight 8, and prevent too speedy a movement, I have shown a ball governor 22, similar to that shown at 16. This governor is revolved by means of a pinion 23, mounted on the stationary shaft 24, and a spur gear 25 which engages the pinion. This spur-gear is mounted upon the shaft A, and the reverse movement of this shaft acts through the gear and pinion to revolve the governor, and through it to move the spindle 24, and thus apply a frictional brake between the spindle and disk 26 so that the return movement of the carrier 4 will be controlled in the same manner that the downward movement is controlled by the governor 16. In this manner I provide a device which will operate automatically in each direction, and it has been found to be practically useful for the purpose intended.

Having thus described my invention, what I claim and desire to secure by Letters Patent is—

1. The combination in a lowering apparatus, of a winding drum and grooved pulleys around which the rope passes, said pulleys being arranged at opposite sides of the center of the drum, and said rope passing from one of said pulleys around the drum and thence passing from the drum around the other pulley and back to and around the drum, a belt or carrier attached to one end of the rope, a counterweight attached to the opposite end of said rope, a governor, and a brake mechanism actuated by the governor to regulate the descent of the carrier.

2. The combination in a lowering apparatus, of a winding drum, and grooved pulleys around which the rope passes, said pulleys being positioned at opposite sides of the drum, and said rope extending from the drum to the pulley at one side and thence back to the drum and from the drum to the other pulley, and finally back to the drum, a belt or carrier attached to the outer end of the rope, a counterweight attached to the opposite end of the rope, a governor, a band brake and drum, a governor spindle connected to the band brake and means by which the spindle is moved by the governor to apply the brake.

3. An automatic lowering and return mechanism consisting of a winding drum, a shaft therefor, a gear wheel mounted on one end of the shaft, a pinion, a vertically disposed hollow shaft upon which the pinion is mounted, a rope passing around said drum, pulleys around which the rope passes, said pulleys being positioned at opposite sides of the drum and said rope extending from the drum to a pulley at one side and thence back to the drum and from the drum to the other pulley, and finally back to the drum, a belt or carrier fixed to one end of the rope, a returning counterweight attached to the other end of said rope, a governor actuated in unison with the descent of the load, said governor having a vertical stem passing through the hollow pinion shaft, a brake mounted upon the drum shaft and connected with the governor spindle, and a clutch connecting the winding and brake drums during the ascent of the carrier, said clutch being disengaged when the load is removed to allow the weight to act and return the carrier.

4. An automatic lowering and return mechanism consisting of a winding drum, a shaft therefor, a gear wheel mounted on one end of the shaft, a pinion, a vertically disposed hollow shaft upon which the pinion is mounted, a rope passing around said drum, pulleys around which the rope passes, said pulleys being positioned at opposite sides of the drum and said rope extending from the drum to a pulley at one side and thence back to the drum and from the drum to the other pulley, and finally back to the drum, a belt or carrier fixed to one end of the rope, a returning counterweight attached to the other end of said rope, a governor actuated in unison with the descent of the load, said governor having a vertical stem passing through the hollow pinion shaft, a brake mounted upon the drum shaft and connected with the governor spindle, and a clutch connecting the winding and brake drums during the ascent of the carrier, said clutch being disengaged when the load is removed to allow the weight to act and return the carrier, and a second governor acting to regulate the speed of the returning parts.

In testimony whereof I have hereunto set my hand in the presence of two subscribing witnesses.

AMBROSE W. FAEH.

Witnesses:
CHARLES EDELMAN,
C. C. COOK.